UNITED STATES PATENT OFFICE 2,201,396

ASPHALT AND PROCESS FOR PRODUCING THE SAME

Paul J. Fryar, Berkeley Park, Calif., assignor to Union Oil Company of California, Los Angeles, Calif., a corporation of California No Drawing. Application January 10, 1938, Serial No. 184,250

15 Claims. (Cl. 196—74)

This invention relates to the manufacture of asphalts which possess characteristics similar to those exhibited by materials known to the art as air-blown or oxidized asphalts.

It is well known in the art of manufacturing air-blown asphalts that such products, when prepared by the conventionel method of air-blowing at elevated temperatures, oil, such as residua from asphalt-base crude oils, possess desirable characteristics such as low temperature susceptibilities, high melting points for given penetrations and moderately high ductilities. While it is possible to obtain by this method materials possessing desirably high melting points and ductilities for given penetrations, certain disadvantages are inherent in the method. Thus, when preparing air-blown asphalts in the conventional distillation equipment, it is difficult to vary independently the three characteristics, penetration-melting point-ductility, a decrease in penetration always resulting in an increase in the melting point and a corresponding decrease in the ductility of the product. Of even greater importance, however, is the fact that the stabilities of such asphalts with respect to weathering or exposure to the effects of light, heat, and the atmosphere are markedly reduced as indicated by the decrease in the solubility of the asphalt in carbon disulfide, carbon tetrachloride, and petroleum solvents. Because of the technical difficulties involved, the air is generally introduced into the oil in bubbles of such size that intimate mixture cannot occur between the air and the asphaltic material, and the latter is not properly agitated. Inasmuch as the full efficiency of the air is not realized by reason of such poor mixing, the rate of reaction is relatively slow and, in fact, must be maintained at a comparatively low value to avoid the likelihood of the asphaltic material becoming overheated with the resultant formation of carbonaceous matter, or carbenes, of low solubility.

Because of the low efficiency of utilization of the oxygen in the conventional type of unit, the air which has passed through the oil is relatively rich in oxygen. Inasmuch as appreciable distillation occurs in this method of operation, the oxygen rich air, when passing through the heated vapors, often tends to react with the latter to such an extent that vapor temperatures may suddenly arise from approximately 200° to as high as 700° or 800° F. The rapidity with which this reaction occurs frequently results in explosions within the still, causing rupture of the latter or of explosion diaphragms built into the still. Moreover, it is often found that appreciable amounts of carbonaceous materials have been formed upon the upper walls and vapor lines of the still as a result of these uncontrolled reactions. It may be readily realized, therefore, that since the relative values of asphalts possessing the same penetration and melting point characteristics will depend largely upon the relative ductilities of the asphalts and their solubilities in various test solvents, air-blown asphalts prepared in the conventional type of still will frequently be of little value because of their low solubilities and poor ductilities.

Many attempts have been made in recent years to correct the aforementioned difficulties. Some of the methods employed have been quite successful in producing satisfactory oxidized asphalts. However, these methods involve accurate and expensive control of the temperature of the charge undergoing oxidation, in the manner and rate of air introduction, and in the length of time of the oxidation run.

It is one of the objects of my invention to provide a simple, efficient and economical process by which asphalts may be produced which possess air-blown characteristics as indicated by high melting points for a given penetration, relatively high ductilities and solubilities in test solvents, and acceptable flash point and weathering characteristics.

It is a further object of my invention to control and vary, independently and at will, the various characteristics of penetration, melting point, ductility and solubility of the asphalt.

It is an important object of my invention to produce asphalts having air-blown characteristics without resorting to the use of air or other oxidizing gases or materials in their production.

It is a further object of my invention to produce an asphalt having weathering properties considerably superior to corresponding products prepared by air-blowing oils or asphalts.

Other objects of my invention will appear from the description of the preferred embodiments of my invention appearing below.

I have found that asphalts possessing low temperature susceptibilities, high melting points for given penetration and moderately high ductilities and solubilities in solvents may be prepared by a procedure which involves simple blending of products known to the art as steam-blown or residual asphalts with suitable lubricating oils or distillates. For example, I have found it to be possible to prepare an asphalt possessing air-blown characteristics as measured by its melting point-penetration relationship by blending steam-blown asphalt with a lubricating oil stock of relatively low viscosity-gravity constant or of relatively high viscosity index, without oxidation of either the blend or the components forming the blend. The asphalt obtained by such a procedure is comparable, with respect to its physical characteristics, with air-blown products of the same melting point and penetration, but is considerably superior to the air-blown or oxidized product with respect to weathering and 86° naphtha solubility characteristics. In fact, the asphalts produced according to my invention have solubilities in 86° naphtha of greater than 60% or 65% by weight. I have found it to be possible, therefore, to produce an asphalt possessing air-blown characteristics and to improve the weathering and solubility characteristics of such a product without resorting to the usual air-blowing process.

The asphalt which I prefer to use is one which is derived from an asphalt base crude oil or a topped residuum of such crude oil and which has been subjected to distillation with steam so as to produce a steam-refined asphalt as a residuum of the crude oil. If desired, the distillation may be conducted under vacuum and with or without the use of steam to effect the removal of the oily products of the crude oil. The distillation is preferably continued until most of the oils have been separated from the asphalt or bitumen and a very high melting point low penetration asphalt is produced. It is desirable to carry out the distillation at as low a temperature as possible so as to prevent cracking or thermal decomposition of any of the vaporizable constituents or of the residue of the crude oil. This is for the purpose of preventing contamination of the asphalt with highly insoluble, coke-like materials which impair the quality of the asphalt.

If desired, the asphalts may be prepared from a topped residuum by subjecting the latter to treatment with a solvent capable of dissolving the oily constituents in the topped residuum but not the bitumen or hard asphalt. For this purpose, I may employ the liquefied normally gaseous hydrocarbons such as ethane, propane, butane, iso-butane or mixtures thereof or pentane, hexane, gasoline, naphtha, etc. In fact, I may employ any solvent which is capable of effecting a separation of the oily components from the solid components of the topped residuum. Moreover, the asphalt may be prepared, if desired, by a similar treatment of the crude oil itself.

The oil which I prefer to employ for blending with the aforementioned asphalts is a lubricating oil distillate or stock, similar to Eastern or paraffine base oils of a high degree of saturation and possessing a relatively low viscosity gravity constant or a relatively high viscosity index. Viscosity gravity constant has been defined by Hill and Coates in the Journal of Industrial and Engineering Chemistry, of 1928, vol. 20, page 641. This constant is an indication of the paraffinicity or naphthenicity of an oil, a high value representing a high degree of naphthenicity while a low value indicates a relatively greater paraffinicity. Lubricating oils from natural crudes range from .903 for an extreme Gulf Coast type to .807 or lower for an eastern Pennsylvania type. The oils which I prefer to use for blending with the asphalt are those having a viscosity gravity constant of less than 0.870 or having a viscosity index of greater than 30, since I have found that little or no improvement in air-blown characteristics is realized in blends utilizing an added mineral oil with a viscosity gravity constant of greater than 0.870 or a viscosity index of less than 30. On the other hand, I may use oils having a viscosity gravity constant as low as 0.795 and a viscosity index as high as 100 or more. I have found that the higher the viscosity index and, correspondingly, the lower the viscosity gravity constant, of the oil used for the blend, the more marked will be the air-blown characteristics of the resulting blend for a given asphalt-oil ratio.

The lubricating oil having the aforementioned preferred characteristics, which may be employed for blending with the asphalt may be obtained naturally from some crudes, or may be produced from the lubricating oil distillates obtained from the naphthenic or Western crude oils by acid treatment or by subjecting these oils to extraction with solvents capable of separating selectively the paraffinic, naphthenic, and aromatic types of oil in accordance with methods now known. Solvents which have been found capable of effecting such a separation of the oil are: liquid sulfur dioxide, mixtures of liquid sulfur dioxide and benzol, chloraniline, nitrobenzene, furfural, phenol, aniline, methyl formate, etc.

The proportions of asphalt and lubricating oil to be used in the blend will, of course, depend upon the penetration and melting point desired in the product, it being understood that the greater the proportion of oil in the latter, the higher will be the penetration and the lower will be the melting point for any given asphalt and oil.

When blending oils of very high viscosity index, for example, 70 and above, with hard asphalts, there is danger of incompatibility in such a mixture if the asphalt does not possess a sufficiently high proportion of oil and resinous material (commonly referred to as "petrolenes") to insure the compatibility of the components of the blend. I have found that this compatibility may be increased by mixing a small amount of a compatibility agent, hereinafter mentioned, to the oil, to the asphalt, or to the blend during or subsequent to the mixing operation. As compatibility agents, I have found to be suitable for the purpose, certain low viscosity index, high solvency oils such as asphalt base lubricating oil distillates or an oil fraction having a viscosity index less than about 30, or wax tailings or other materials high in unsaturated, aromatic or naphthenic hydrocarbon content. I have found extracts derived from the treatment of lubricating oils with selective solvents to be particularly useful for the purpose.

One agent that I have used with considerable success is an extract resulting from the sulfur-dioxide treatment of western paraffinaceous lubricating oil and possessing an A. P. I. gravity of 11.0, a viscosity of 297 seconds Saybolt Universal at 210° F., a flash point of 515° F. (Cleveland Open Cup) and a viscosity index of less than —30.

The quantity of compatibility agent to be used will, of course, depend upon the ratio of bitumen or asphalt blended with the oil and upon the characteristics of the agent itself. I have found that small amounts of the agents, for example 0.5 to 10% by volume are suitable for practically all blends of asphalt with oil.

In order to effect the blend of asphalt with the oil, it is preferable to heat the asphalt to a temperature above its actual melting point prior to the addition of the oil and to maintain the blend at an elevated temperature for a period of time sufficient to ensure a uniform blend. The compatibility agent may be incorporated at any time during the heating of the components.

The following are submitted as specific examples of my invention which, however, are not to be considered as limiting but merely as illustrative of the invention.

Example 1

72.5 parts by weight of a steam-blown asphalt produced by steam distilling a residuum of asphalt base crude oil derived from the Poso Creek district of California at a temperature of approximately 675° F. and having a penetration of 6 at 115° F., a melting point of 241° F., a ductility of 0.0 at 77° F. and a flash point of 655° F. (Pensky-Martens) were blended with 27.5 parts by weight of a lubricating oil having an A. P. I. gravity of 20.5, a viscosity of 119 seconds Saybolt Universal at 210° F., a viscosity index of about 35 and a viscosity gravity constant of 0.859. The blend was effected at a temperature of approximately 350° F. for ten minutes. The lubricating oil was produced by solvent treatment with liquid sulfur dioxide of a lubricating distillate derived from a crude oil from the Santa Fe Springs field of California.

The characteristics of the final blend were as follows: The asphalt had penetrations of 10, 15 and 32 at 32° F., 77° F. and 115° F., respectively, a melting point of 178° F., a flash point of 480° F. (Pensky-Martens) and a ductility of 3.0 cms., and a solubility in 86° naphtha of 70+%.

A comparison with an asphalt produced from the same residuum by steam distillation to about the same melting point as that possessed by the blend showed that the blend had a higher penetration and a higher ductility than the steam-blown product. This steam-blown asphalt had penetrations of 0, 4 and 18 at 32° F., 77° F. and 115° F., respectively, a melting point of 176° F., a flash point of 500+F. (Pensky-Martens) and a ductility of 0.0 cm. at 77° F. and a solubility in 86° naphtha of 64%.

Example 2

Approximately 62 parts by weight of a steam distilled asphalt produced from a residuum derived from Poso Creek asphalt base crude oil were blended with 38 parts by weight of a lubricating oil having an A. P. I. gravity of 23.2, a viscosity of 185 seconds Saybolt Universal at 210° F. and viscosity index or 85 and a viscosity gravity constant of 0.832. The lubricating oil was a Mid-Continent type steam refined cylinder stock.

The characteristics of the final blend were as follows: It had penetrations of 54 and 170 at 32° and 77° F., respectively, a melting point of 164, a flash point of 500+ (Pensky-Martens), a ductility at 77° F. of 3.5 cms. and a solubility in 86° naphtha of 70+%. A steam distilled asphalt produced from the same residuum and possessing approximately the same melting point as the above blend had penetrations of 0 and 5 at 32° and 77° F., a flash point of 500+° F., a ductility of 0.0 cm. at 77° F. and a solubility in 86° naphtha of 65%.

Example 3

Approximately 62 parts by weight of a steam distilled asphalt produced from Santa Fe Springs asphalt base residuum were blended with 38 parts by weight of a lubricating oil having an A. P. I. gravity of 24.2, a viscosity of 207 seconds Saybolt Universal at 210° F., and a viscosity index of 100 and a viscosity gravity constant of 0.820. The lubricating oil was a Pennsylvania steam refined cylinder stock.

The characteristics of the final blend were as follows: It had penetrations of 38 and 82 at 32° and 77° F., respectively, a melting point of 190, a flash point of 570 (Pensky-Martens), a ductility at 77° F. of 3.6 cms. and a solubility in 86° naptha of 72.4%. A steam distilled asphalt produced from the same asphalt residuum and possessing approximately the same melting point as the above blend had penetrations of 2 and 20 at 77° and 115° F., a flash point of 500+° F., a ductility of 0.0 cm. at 77° F., and a solubility in 86° naptha of 60%.

Example 4

Approximately 62 parts by weight of a steam distilled asphalt produced from Santa Fe Springs asphalt base residuum were blended with 33 parts by weight of a lubricating oil, the same as mentioned in Example 3, and approximately 5 parts by weight of a compatibility agent was incorporated into the mixture at a temperature of 350° F. The compatibility agent had an A. P. I. gravity of 8.4°, a viscosity of 522 seconds Saybolt Universal at 210° F., a flash point of 505° F. (Cleveland Open Cup) and a viscosity index of less than −30. It represented the extract resulting from the treatment of a paraffinaceous western lubricating oil with liquid sulfur dioxide.

The characteristics of the final blend were as follows: It had penetrations of 47 and 170 at 77° and 115° F., respectively, a melting point of 185, a flash point of 570° F. (Pensky-Martens), a ductility at 77° F. of 3.4 cms. and a solubility in 86° naptha of 71.9%. A steam distilled asphalt produced from the same asphalt residuum of approximately the same melting point as the above blend had penetrations of 2 and 20 at 77° and 115° F., a flash point of 500+° F., a ductility of 0.0 cm. at 77° F. and a solubility in 86° naptha of 60%.

The above description of my invention is not to be considered as limiting but only as illustrative of the invention, as many modifications may be made within the scope of the following claims.

I claim:

1. A process for the production of asphalt having characteristics of oxidized asphalt without subjecting the asphalt to substantial oxidation which comprises blending an unoxidized asphalt, a lubricating oil and a compatibility agent.

2. A process for the production of asphalt having characteristics of oxidized asphalt without subjecting the asphalt to substantial oxidation which comprises blending an unoxidized asphalt, a lubricating oil having a viscosity index of greater than approximately 70 and a compatibility agent.

3. A process for the production of asphalt having characteristics of oxidized asphalt without subjecting the asphalt to substantial oxidation which comprises blending an unoxidized asphalt, a raffinate produced by extracting a lubricating oil with a solvent and a compatibility agent.

4. A composite asphalt possessing characteristics of oxidized asphalt comprising a blend of an unoxidized asphalt and a lubricating oil having a viscosity index of greater than 70, said composite asphalt being produced without substantial oxidation of the blend.

5. A composite asphalt possessing characteristics of oxidized asphalt comprising a blend of an unoxidized asphalt and a lubricating oil having a viscosity index of greater than 30 said composite asphalt being produced without substantial oxidation of the blend.

6. A composite asphalt possessing characteristics of oxidized asphalt comprising a blend of an unoxidized asphalt, a lubricating oil and a small amount of a compatibility agent said composite asphalt being produced without substantial oxidation of the blend.

7. A composite asphalt possessing characteristics of oxidized asphalt comprising a blend of an unoxidized asphalt, a lubricating oil having a viscosity index of greater than approximately 70 and a small amount of a compatibility agent said composite asphalt being produced without substantial oxidation of the blend.

8. A composite asphalt possessing characteristics of oxidized asphalt comprising a blend of an unoxidized asphalt and a lubricating oil having a viscosity index of greater than 30, said composite asphalt being greater than 60% soluble in 86° naphtha said composite asphalt being produced without substantial oxidation of the blend.

9. A composite asphalt possessing characteristics of oxidized asphalt comprising a blend of approximately 62 parts by weight of an unoxidized asphalt and approximately 38 parts by weight of a lubricating oil having a viscosity index of greater than 30, said composite asphalt having a greater solubility in 86° naphtha than an oxidized asphalt of the same melting point and penetration said composite asphalt being produced without substantial oxidation of the blend.

10. A composite asphalt possessing characteristics of oxidized asphalt comprising a blend of approximately 62 parts by weight of an unoxidized asphalt, approximately 33 parts by weight of a lubricating oil having a viscosity index of greater than 30 and 5 parts by weight of a compatibility agent having a viscosity index of less than −30, said composite asphalt having a greater solubility in 86° naphtha than an oxidized asphalt of the same melting point and penetration said composite asphalt being produced without substantial oxidation of the blend.

11. A composite asphalt as in claim 5 in which the unoxidized asphalt is an asphalt which has been precipitated from asphalt-containing oil by means of an asphalt precipitating solvent.

12. A composite asphalt as in claim 5 in which the unoxidized asphalt is an asphalt which has been precipitated from asphalt-containing oil by means of a liquefied normally gaseous hydrocarbon.

13. A composite asphalt as in claim 5 in which the unoxidized asphalt is an asphalt which has been precipitated from asphalt-containing oil by means of propane.

14. A composite asphalt as in claim 5 in which the unoxidized asphalt is an asphalt which has been precipitated from asphalt-containing oil by means of a normally liquid hydrocarbon.

15. A composite asphalt as in claim 5 in which the unoxidized asphalt is an asphalt which has been precipitated from asphalt-containing oil by means of pentane.

PAUL J. FRYAR.